3,318,856
PROCESS OF GELLING POLYVINYL ALCOHOL
Alden J. Deyrup, West Goshen Township, Pa., assignor to
E. I. du Pont de Nemours and Company, Wilmington,
Del., a corporation of Delaware
No Drawing. Filed Apr. 3, 1964, Ser. No. 357,274
7 Claims. (Cl. 260—91.3)

This invention relates to polyvinyl alcohol compositions containing gelling agents, and also to methods for the controlled gelation of aqueous polyvinyl alcohol solutions. This application is a continuation-in-part of my prior copending application U.S. S.N. 282,160 filed May 21, 1963.

Many methods for gelling aqueous polyvinyl alcohol solutions are known in the art. Many of these prior art gelling agents generally act instantaneously. That is, these compounds crosslink polyvinyl alcohol immediately upon contact therewith. Such prior art gelling agents are satisfactory where such instantaneous reaction can be tolerated, for example, in the application of such a gelling agent to the surface of a preformed polyvinyl alcohol film.

However, in many instances it is desired to prepare an aqueous polyvinyl alcohol solution containing a gelling agent which remains stable for extended periods of time (in some instances, a matter of days or weeks) without causing any significant amount of gelation, but which upon subjection to convenient treatment then effects the gelation of the solution. Moreover, there has been a long-recognized need for a gelling agent which the manufacturer of polyvinyl alcohol may add to the dry product, from which product the consumer can prepare a stable, fluid, nongelled aqueous solution, and then effect gelation thereof by convenient treatment when desired.

For example, recently polyvinyl alcohol has been shown to be very useful in the preparation of very light weight foams suitable as insulating, acoustical, and packaging materials. In the preparation of such foams, it is necessary to first prepare an aqueous polyvinyl alcohol solution containing a gelling agent which does not cause instantaneous gelatin. Next, the foam is generated from the solution, which is then flowed through a hose or pipe to the position or place of application, whereafter it is essential that the polyvinyl alcohol foam very quickly gel.

It will be recognized that the gelling agent must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc. and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part and lose proper bonding of the foam to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure. In contrast, a foam in which the liquid phase has not been gelled is readily hosed, piped, spread and flowed into position.

Consequently, the prior art gelling agents which cause instantaneous or uncontrollable gelation, cannot be used in such a method for foam preparation. Instead, it is necessary to use a method for controlled gelation. That is, a method whereby an aqueous polyvinyl alcohol solution containing a gelling agent which does not cause immediate gelation, but which causes rapid gelation upon proper convenient treatment after a desired time interval.

In other uses of aqueous polyvinyl alcohol solutions it is also desired to employ such controlled gelation methods. For example, in the application of coating compositions comprising aqueous polyvinyl alcohol solutions onto porus substrates such as paper or paperboard, it is desired to have a gelling agent incorporated into such composition which does not instantaneously gel the composition so that it may be conveniently applied onto the substrate but which will cause rapid gelation shortly thereafter to prevent the composition from soaking into the substrate.

An object of this invention is to provide an improved polyvinyl alcohol composition containing a gelling agent. A further object is to provide a composition comprising polyvinyl alcohol and a gelling agent which will remain stable for extended periods of time without causing any significant crosslinking of the polyvinyl alcohol. Another object is to provide a composition comprising polyvinyl alcohol and a gelling agent which composition can be formed into a stable fluid aqueous solution, but which upon convenient treatment will rapidly gel after a desired time interval. An additional object is to provide an improved method for the gelation of aqueous polyvinyl alcohol solutions. Still another object is to provide an improved method for the controlled gelation of aqueous polyvinyl alcohol solutions whereby a gelling agent is added to said solution which does not cause instantaneous gelation, but which upon convenient treatment causes rapid gelation after a desired time interval.

These and other objects are fully attained by the present invention which provides the composition comprising polyvinyl alcohol and a titanium oxalate complex, and also provides the process comprising preparing an aqueous solution of polyvinyl alcohol and a titanium oxalate complex, said solution having a pH of up to about 6, and thereafter adjusting the pH to at least about 7 causing said solution to gel.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the acetate or carboxylate groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises.

The titanium oxalate complexes used in this invention are titanium compounds wherein titanium in the valence state of +4 is complexed with oxalate radicals (including binoxalate radicals), and usually other ions, radicals, and hydrogen bonded water molecules. For example, one suitable titanium oxalate complex which is commerically available is potassium titanium oxalate complex which may be represented by the empirical formula

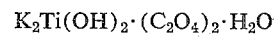

$$K_2Ti(OH)_2 \cdot (C_2O_4)_2 \cdot H_2O$$

Obviously, the titanium oxalate complex must be soluble in the aqueous polyvinyl alcohol solution, at lesat to the concentration necessary to effect subsequent gelation, as explained hereinbelow, and should be stable in water solution, preferably even up to the boiling point, without decomposing and precipitating titanium hydroxide. Such titanium oxalate complexes are familiar to those skilled in the art, and as is well known in the art, are completely different from the simple titanium salts. In the practice of this invention free oxalate may be present in conjunction with the titanium oxalate complex. The term "free oxalate" means any excess oxalate ion ($C_2O_4^=$) or binoxalate ion ($HC_2O_4^-$) present in addition to one gram molecular weight total of such ions complexed with titanium per gram atomic weight of titanium. As explained hereinafter, it is often desirable that free oxalate be present in the composition comprising polyvinyl alcohol and titanium oxalate complex.

It is critical to this invention that the titanium be complexed with oxalate radicals. Other titanium carboxylate complexes have been used heretofore to crosslink polyvinyl alcohol. However, these other, although similar, carboxylate complexes are totally unsuitable to satisfactorily accomplish the objectives of this invention. For example, the titanium lactate complexes are unstable in water solution, either in the presence or absence of polyvinyl alcohol. Such titanium lactate complexes must be used only as freshly prepared solution complexes. Obviously, the need for this fresh preparation imposes onerous requirements for many purposes. The instability of titanium lactate complexes manifests itself in several ways. For example, after a short period of time in aqueous solution, the titanium lactate complex may lose partially or entirely the function of subsequent gelling of the polyvinyl alcohol solution even at a high pH.

In the practice of this invention, a composition comprising polyvinyl alcohol and the titanium oxalate complex is prepared by any convenient method. The manufacturer of polyvinyl alcohol can dry blend the polyvinyl alcohol and titanium oxalate complex, using suitable mixing equipment, and the resulting composition will remain stable for extended periods of time. The titanium oxalate complex should be present in the composition in an effective amount to cause gelation of an aqueous solution of the polyvinyl alcohol. The precise lower limit of the concentration of titanium oxalate complex depends primarily upon the particular type of polyvinyl alcohol used, the concentration of the polyvinyl alcohol in the subsequent aqueous solution, and the strength or firmness of the ultimate gel which is desired. Generally, the titanium oxalate complex must be present in an amount equivalent to at least about 0.002 gram atom of titanium per 100 grams of polyvinyl alcohol. In most instances, lesser amounts are insufficient to cause gelation of the aqueous polyvinyl alcohol solution. There is no actual critical upper limit on the concentration of titanium oxalate complex, since excessive amounts apparently produce no deleterious effects. Large excess amounts may result in an opaque gel instead of the usual transparent gel. However, this result is immaterial in most instances. Therefore, the usual concentration of titanium oxalate complex in the composition is equivalent to about 0.002–0.2 gram atom of atoms of titanium per 100 grams of polyvinyl alcohol.

When ready for use, an aqueous solution of polyvinyl alcohol is prepared, taking precautions, as explained below, that the pH is less than about 6. The concentration of polyvinyl alcohol in the solution depends, of course, upon the type of polyvinyl alcohol employed, and the end use for which the solution is intended, as is familiar to those skilled in the art. In most instances, this polyvinyl alcohol concentration is from about 1 to about 20% by weight of solution.

As stated hereinbefore, the pH of the aqueous solution of polyvinyl alcohol and titanium oxalate complex, as initially prepared, must be less than about 6. This acidic pH may be obtained by the addition of oxalic acid, binoxalates or most other acids of suitable strength, generally having a dissociation constant of greater than about $10^{-5}$, such as acetic, sulfuric, hydrochloric, propionic, succinic, adipic, sulfamic, and hydriodic acids, and the like. Preferably, acids which form complexes or insoluble precipitates with titanium having a valence state of +4, such as phosphoric and citric acids, excepting, of course, oxalic acid, should not be used to adjust the preliminary solution to the acidic range. There is no critical lower limit on the pH of this preliminary solution; however, since extremely acidic solutions sometimes present corrosion problems with the most commonly used industrial process equipment, it is normally desired that the pH of this preliminary solution be from 3 to about 6.

When the pH of an aqueous solution of polyvinyl alcohol and titanium oxalate complex is at about 6 or below, the solution is fluid and nongelled. However, when the pH of the solution is adjusted to at least about 7, gelling occurs. For many uses, there is no critical upper limit on the basic pH, therefore the solution may be adjusted to a pH of up to 14, if so desired. However, the rate of gelation is faster at relatively high pH than at relatively low pH. Consequently, at very high pH, the gelling may occur so fast that it is sometimes not practical to mix the aqueous solution of polyvinyl alcohol and titanium oxalate complex with the basic reagent used to adjust the pH and, if desired, then subject the solution to subsequent treatment, such as foaming, etc. Therefore, normally the gelation is preferably effected by adjusting the pH to about 7 to 9.

It is frequently desired to control the rate of gelation. As mentioned above, the rate of gelation can be made more rapid by increasing the pH. Also, the rate of gelation surprisingly can be made more rapid by lowering the concentration of free oxalate in the solution. When adjusting the rate of gelation by controlling the concentration of free oxalate, it should be noted that a great excess of oxalate may not only retard gelation, but also may prevent it altogether at a pH of near 7. However, even if the solution is saturated with free oxalate, gelation can still be effected by simply adjusting the pH to a higher level.

To adjust the pH to effect gelation, ammonia, amines, such as the mono-, di- and tri-ethanol amines, and the like or basic salts such as alkali carbonates, including potassium or sodium carbonate, etc. may be used. Ammonia and the amines may be used alone or in the presence of some of their acid salts, such as ammonium chloride, the hydrochlorides of the mono-, di-, and tri-ethanol amines, and so forth, to establish a buffer action.

A particularly desired method of adjusting the pH to at least about 7 is to incorporate a carbonic acid-bicarbonate buffer into the solution. In this case, the pH is first automatically adjusted to the desired pH, dependent upon the ratio of carbonic acid to bicarbonate, and then the gelling is accelerated and strengthened by the liberation of carbon dioxide, shifting the buffer pH to a higher alkalinity. Preferably, the molar ratio of carbonic acid to bicarbonate in this buffer is from 5:1 to 1:5. This method is particularly useful in the generation of polyvinyl alcohol foams, since the carbon dioxide escapes into the foam voids, changing the foam into a very rigid structure at a very rapid rate.

The carbonic acid-bicarbonate buffer may be established in many different ways. For example, by dissolving carbon dioxide in an appropriate amount in a solution which contains a dissolved alkali metal, ammonium, substituted ammonium or alkali metal carbonate, such as sodium carbonate, potassium carbonate, lithium carbonate, or bicarbonate, such as sodium bicarbonate, ammonium bicarbonate, lithium bicarbonate, and the like.

A convenient method is to prepare two aqueous solutions, the first of which contains polyvinyl alcohol and titanium oxalate complex and an acid providing a pH of about 6 or less, and the second of which contains a bicarbonate in an excess stoichiometric amount for reaction with the acid. The two solutions are mixed, and the acid and bicarbonate react to form carbonic acid, which together with the excess bicarbonate establishes the desired buffer. Preferably, the second solution contains a sufficient amount of bicarbonate to provide a molar ratio of carbonic acid to bicarbonate of from 5:1 to 1:5. The acid in the first solution must be stronger than carbonic acid, that is, it must have a dissociation constant of greater than $10^{-7}$ or preferably, greater than $10^{-6}$. However, it is preferred to use a relatively weak acid, so that the resulting solution is not excessively acidic so as to create corrosion problems when used in common metal equipment, for example, a foam generator. Suitable acids include, acetic, hydrochloric, sulfuric, propionic, succinic, adipic, sulfamic, hydriodic acids, and the like. Suitable bicarbonates include sodium bicarbonate, potassium bicarbonate, lithium bicarbonate, ammonium bicarbonate, etc.

In some instances it is desired to include an oxalate, such as sodium oxalate in the second solution to provide further control over the rate of gelation, as explained above.

It has been discovered that the reaction of polyvinyl alcohol and titanium oxalate complex with a base to form a gel is a reversible reaction. Thus, the gel can be reconverted to a liquid by lowering the pH and/or adding excess oxalate ion.

It has also been discovered that conditions can be found by suitable proportioning of water, polyvinyl alcohol, titanium oxalate complex, free oxalate ion, and carbonic acid and bicarbonate ions, under which conditions the mixture is a liquid until exposed to air, when it becomes gelled as a result of loss of carbon dioxide. Thus, remarkably, a solution can be made which is fluid, so that it can be foamed by passing air through it, and yet the foam is gelled almost immediately after generation, and hence, shows no drainage and possesses great stability. The conditions for this useful state are somewhat critical, but since there are numerous dependent variables involved, such as the type of polyvinyl alcohol and its concentration, concentration of the titanium oxalate complex, pH, etc., the precise conditions defy precise predictions and must be arrived at by trial and error techniques. However, these conditions are conveniently arrived at by starting with the desired aqueous solution of polyvinyl alcohol and titanium oxalate complex, and then decreasing the titanium or increasing the free oxalate, in the presence of a carbonic acid-bicarbonate buffer, until the proper conditions are attained.

This invention is further illustrated by the following examples.

EXAMPLE 1

A 0.2 molar solution of titanium oxalate complex, $K_2Ti(OH)_2(C_2O_4)_2 \cdot H_2O$ was made by stirring together 7.09 parts by weight of a commercial potassium titanium oxalate salt having an analysis of 17.4%, by weight, titanium, 14.1% potassium, 14.1% carbon and 1.3% hydrogen, with 0.25 part by weight of oxalic acid.

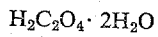

and 92.66 parts by weight of water. A solution "A" was prepared by mixing 2.65%, by weight, of a commercial high molecular weight polyvinyl alcohol, 0.02% sodium oxalate, $Na_2C_2O_4$, 0.015% oxalic acid

0.18% of acetic acid, and 6.0% of the titanium oxalate complex solution (equivalent to 0.006 gram atom of titanium per 100 grams of polyvinyl alcohol), the balance being water. This solution "A" was heated to 90–100° C. to dissolve the polyvinyl alcohol, and then cooled to room temperaute. The solution was a liquid having a pH of about 4.0. A solution "B" was separately prepared containing 0.35 mole per liter of sodium bicarbonate $NaHCO_3$ in water, and having a pH of about 8.9. One part by volume of solution "B" was stirred into 3 parts by volume of solution "A." No immediate visible change occurred. However, in 27 seconds the liquid set to a clear gel having a pH of about 6.7. The mixture of solutions "A" and "B," immediately after mixing, was calculated to contain 2.0%, by weight, of polyvinyl alcohol, 0.009 mole per liter of titanium, and 0.011 mole per liter of free oxalates (not including 0.009 molar oxalate complexed with 0.009 molar titanium), as well as by-product acetate, carbonic acid, and residual bicarbonate ion.

EXAMPLE 2

Samples of solution "A" were prepared as shown in Example 1. Different solutions "B" were prepared as shown in Example 1, except that in addition to the 0.35 mole per liter of sodium bicarbonate, 0.03, 0.06, 0.08, 0.16 mole per liter of sodium oxalate, respectively, were added to each solution "B." When mixtures of 1 part by volume of these "B" solutions were stirred into 3 parts by volume of the "A" solutions, they formed clear, transparent gels, respectively, in 71, 140, 195, and 344 seconds, thus illustrating one method for controlling the desired gelation time.

EXAMPLE 3

A solution "A" was prepared as shown in Example 1. An aqueous solution "B" was prepared containing 0.08 mole per liter of sodium oxalate, 0.348 mole per liter of sodium bicarbonate, 0.116 mole per liter of boric acid, $H_3BO_3$, and 12% by weight of glycerol. The glycerol and boric acid were used to modify the final buffer pH. To 3 parts by volume of solution "A" was added 1 part by volume of solution "B." The mixture was stirred. Within about six minutes the mixture had increased in viscosity but it had not gelled, but remained as a liquid except for a gelled skin on the top surface where exposed to air. A foam was blown in this liquid by passing air bubbles through a capillary tube under the surface of the liquid. The head of foam was found to be extremely stable, and by breaking it down mechanically it was found to consist of a firm elastic gel. Meanwhile the remaining liquid, not incorporated in a foam, remained liquid. When placed in a closed container, it was still a liquid after several days, and yet retained the property of yielding a gelled foam when blown with air.

What I claim is:

1. Process for preparing a gel structure which comprises admixing (I) an aqueous solution containing 1 to 20 weight percent polyvinyl alcohol, a dissolved titanium oxalate complex having the empirical formula

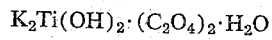

in amount providing 0.002 to 0.2 gram atom of titanium per 100 grams of polyvinyl alcohol, and acid having a dissociation constant of greater than about $10^{-6}$ in amount sufficient to impart a pH in the range of from about 3 to about 6 to said solution, and (II) an aqueous alkaline carbonic acid/bicarbonate solution in amount sufficient to bring the pH of the mixture of (I) and (II) to the range of from about 7 to about 9, the molar ratio of carbonic acid to bicarbonate in said solution (II) being in the range of from 5:1 to 1:5.

2. Process of preparing a gel structure which comprises admixing (I) an aqueous solution containing from about 1 to about 20 weight percent polyvinyl alcohol, a dissolved titanium oxalate complex providing from about 0.002 to about 0.2 gram atom of tetravalent titanium per 100 grams of polyvinyl alcohol, dissolved oxalate in amount greater than 1 mole per gram atom of titanium, and acid having a dissociation constant of greater than $10^{-7}$ in amount sufficient to impart a pH of about 6 or less to said solution, and (II) an aqueous alkaline carbonic acid/bicarbonate buffer solution in amount sufficient to bring the pH of the mixture of (I) and (II) to at least about 7.

3. Process of preparing a gel structure which comprises admixing (I) an aqueous solution containing from about 1 to about 20 weight percent polyvinyl alcohol, a dissolved titanium oxalate complex in amount providing from about 0.002 to about 0.2 gram atom of tetravalent titanium per 100 grams of polyvinyl alcohol and at least one mole of oxalate per gram atom of titanium and acid having a dissociation constant of greater than $10^{-7}$ in amount sufficient to impart a pH of about 6 or less to said solution, and (II) aqueous alkaline bicarbonate solution sufficient to bring the pH of the mixture of (I) and (II) to at least about 7.

4. Process of preparing a gel structure which comprises admixing (I) an aqueous solution having a pH of not more than about 6 and containing from about 1 to about 20 weight percent polyvinyl alcohol and a dissolved titanium oxalate complex providing at least about 0.002 gram atom of tetravalent titanium per 100 grams of polyvinyl alcohol and at least one mole of oxalate per gram atom of titanium and (II) base comprising at least one member of the group consisting of ammonia, amine, and basic salt, in amount sufficient to bring the pH of the mixture of (I) and (II) to at least about 7.

5. Process of preparing a composition fluid at a pH of about 6 or less and gellable at a pH of about 7 or more which comprises dissolving polyvinyl alcohol and a titanium oxalate complex containing tetravalent titanium and at least one mole of oxalate per gram atom of titanium in an aqueous medium at a pH of about 6 or less in proportion and amount to provide a solution containing from about 1 to about 20 weight percent polyvinyl alcohol, and at least about 0.002 gram atom of tetravalent titanium per 100 grams of polyvinyl alcohol.

6. A fluid aqueous composition having a pH of about 6 or less and gellable at a pH of about 7 or more, said composition comprising an aqueous solution containing from about 1 to about 20 weight percent polyvinyl alcohol, and dissolved titanium oxalate complex providing at least about 0.002 gram atom of tetravalent titanium per 100 grams of polyvinyl alcohol, and at least one mole of oxalate per gram atom of titanium.

7. A dry blend comprising a mixture of polyvinyl alcohol and a titanium oxalate complex dissoluble in water to provide tetravalent titanium and at least one mole of oxalate per gram atom of titanium, said mixture being dissoluble in aqueous media at a pH of about 6 or less to provide a solution gellable at a pH of about 7 or more.

References Cited by the Examiner
UNITED STATES PATENTS

| | | | |
|---|---|---|---|
| 2,489,651 | 11/1949 | Langkammerer | 260—91.3 |
| 2,720,468 | 10/1955 | Shacklett | 260—91.3 |
| 2,870,181 | 11/1959 | Shacklett | 260—91.3 |
| 2,938,812 | 5/1960 | Marzocchi et al. | 260—91.3 |
| 3,017,282 | 1/1962 | Brill | 260—91.3 |
| 2,097,097 | 7/1963 | Oster et al. | 260—91.3 |

JOSEPH L. SCHOFER, *Primary Examiner.*

JAMES A. SEIDLECK, M. B. KURTZMAN, J. F. McNALLY, *Assistant Examiners.*